United States Patent
He et al.

(10) Patent No.: US 9,400,348 B2
(45) Date of Patent: Jul. 26, 2016

(54) DISPLAY BACKLIGHT UNIT HAVING REFLECTING STRUCTURE FOR REDUCING HOTSPOTS

(71) Applicants: BOE TECHNOLOGY GROUP CO., LTD., Beijing (CN); HEFEI BOE DISPLAY LIGHT CO., LTD., Hefei (CN)

(72) Inventors: Shuyong He, Beijing (CN); Guohui Chen, Beijing (CN); Peina Wang, Beijing (CN)

(73) Assignees: BOE Technology Group Co., Ltd., Bejing (CN); Hefei BOE Display Light Co., Ltd., Hefei (CN)

( * ) Notice: Subject to any disclaimer, the term of this patent is extended or adjusted under 35 U.S.C. 154(b) by 244 days.

(21) Appl. No.: 14/103,792

(22) Filed: Dec. 11, 2013

(65) Prior Publication Data

US 2014/0160732 A1    Jun. 12, 2014

(30) Foreign Application Priority Data

Dec. 11, 2012 (CN) .......................... 2012 1 0533999

(51) Int. Cl.
| | |
|---|---|
| *G02F 1/13357* | (2006.01) |
| *F21V 8/00* | (2006.01) |
| *G02F 1/1335* | (2006.01) |

(52) U.S. Cl.
CPC ........ *G02B 6/0031* (2013.01); *G02F 1/133615* (2013.01)

(58) Field of Classification Search
CPC . G02F 1/133615; F21V 2200/20; F21V 1/12; F21V 7/0666; F21V 13/04; F21V 13/08; G02B 6/0013; G02B 6/0023; G02B 6/0031; G09F 2013/049; G09F 2013/0422; G09F 13/14; G09F 13/18; G09F 13/1804; G09F 13/1831; G09F 13/1836
See application file for complete search history.

(56) References Cited

U.S. PATENT DOCUMENTS

| | | | | |
|---|---|---|---|---|
| 3,829,677 | A * | 8/1974 | DeLlano | F21V 7/005 362/346 |
| 4,242,725 | A * | 12/1980 | Douma | F21V 7/005 362/217.06 |
| 5,365,411 | A * | 11/1994 | Rycroft | G09F 13/14 362/20 |
| 7,156,540 | B2 * | 1/2007 | Haines | F21V 7/0008 362/217.07 |
| 7,188,989 | B2 * | 3/2007 | Miyashita | G02B 6/002 362/621 |

(Continued)

FOREIGN PATENT DOCUMENTS

| | | |
|---|---|---|
| CN | 1512231 A | 7/2004 |
| CN | 101114074 A | 1/2008 |

(Continued)

OTHER PUBLICATIONS

First Office Action for corresponding Chinese Patent Application No. 201210533999.7, 15 pages. (including English translation), (Jul. 10, 2014).

*Primary Examiner* — Ismael Negron
(74) *Attorney, Agent, or Firm* — Blakely Sokoloff Taylor & Zafman LLP

(57) ABSTRACT

A light-emitting device including a lampshade and a light-source set arranged within the lampshade. The lampshade includes a light-reflecting structure set for respectively reflecting rays in a middle portion of light emitted from a corresponding light source, towards two sides of the corresponding light source. A backlight unit including the light-emitting device and a display device including the backlight unit are provided.

18 Claims, 3 Drawing Sheets

A-A

(56) References Cited

U.S. PATENT DOCUMENTS

| | | | | |
|---|---|---|---|---|
| 8,167,474 B2* | 5/2012 | Tanoue | ............... | G02B 6/0016 362/607 |
| 8,596,807 B2* | 12/2013 | Jeong | ............... | G02F 1/133605 362/97.1 |
| 9,103,955 B2* | 8/2015 | Zhou | ............... | G02B 6/0068 |
| 2006/0269189 A1* | 11/2006 | Seo | ............... | G02B 6/0028 385/39 |
| 2006/0285356 A1* | 12/2006 | Tseng | ............... | G02B 6/0016 362/608 |
| 2008/0175022 A1* | 7/2008 | Sugiura | ............... | G02B 6/0091 362/609 |
| 2009/0016057 A1* | 1/2009 | Rinko | ............... | G02B 6/0016 362/268 |
| 2012/0050649 A1* | 3/2012 | Yeo | ............... | G02B 6/002 349/65 |

FOREIGN PATENT DOCUMENTS

| CN | 101440925 A | 5/2009 |
|---|---|---|
| CN | 102043275 A | 5/2011 |

* cited by examiner

A-A

A-A

DISPLAY BACKLIGHT UNIT HAVING REFLECTING STRUCTURE FOR REDUCING HOTSPOTS

FIELD OF THE INVENTION

The present invention relates to a technology field for manufacturing a display, in particular, relates to a light-emitting device, a backlight unit including the light-emitting device, and a display device including the backlight unit.

BACKGROUND OF THE INVENTION

Nowadays, a liquid crystal display (LCD) has been dominant in the panel display market for its advantages of small size, low power consumption, low radiation, and the like. In order to display an image on a screen of the LCD, it is necessary to configure a backlight unit (BLU) for a display panel. This is because the liquid crystals in the LCD can not emit light by themselves, and the liquid crystals just regulate light.

In general, the BLUs may be categorized into side-edge backlight units and direct-type backlight units according to the distribution positions of light sources in the BLUs. A light source in the side-edge backlight unit is positioned at a side of the display panel, and a light source in the direct-type backlight unit is positioned at the bottom of the display panel. The side-edge backlight unit is widely used due to its advantages of low cost, thin profile etc.

The existing side-edge backlight unit generally includes a light guide plate and a light-emitting device arranged at a side of the light guide plate. As shown in FIG. 1, the light-emitting device in the prior art includes a U-shaped lampshade 11 and at least one light source 33 arranged on the inner bottom of the U-shaped lampshade 11 via a printed circuit board (PCB) 22. When the light source 33 is formed of a Light Emitting Diode (LED), due to the limitation of a LED's own conditions such as a light-emitting angle (which is generally 120 degrees), light intensity at the central region of light emitted from each LED is higher. Thus, brightness at a corresponding position on the light guide plate is larger. Light intensity at the intersection region of light emitted from two adjacent LEDs is lower. Thus, brightness at a corresponding position on the light guide plate is smaller. Therefore, the intersection region of light emitted from two adjacent LEDs will result in a Hotspot phenomenon (i.e., a phenomenon of non-uniform brightness) on the light guide plate and form dark areas, thus image quality is affected.

SUMMARY OF THE INVENTION

In view of the above defects in the prior art, the technical problem to be solved by the present invention is to provide a light-emitting device capable of improving a Hotspot phenomenon, a backlight unit including the light-emitting device, and a display device including the backlight unit.

Solutions to Solve the Problems

The present invention provides a light-emitting device including a lampshade and a set of light sources arranged within the lampshade, wherein the lampshade includes a set of light-reflecting structures, each light-reflecting structure in the set of light-reflecting structures is used for reflecting rays at the central region of light emitted from a light source corresponding to the light-reflecting structure respectively towards two sides of the corresponding light source.

Preferably, the set of light sources includes at least one light source, the respective light sources are arranged separately, the set of light-reflecting structures includes at least one light-reflecting structure, each of the at least one light source corresponds to one of the at least one light-reflecting structure, and each of the at least one light-reflecting structure is used for reflecting rays at the central region of light emitted from its corresponding light source towards two sides of the corresponding light source.

Preferably, the lampshade includes a bottom wall and two sidewalls arranged oppositely, the two sidewalls are respectively positioned at two sides of the bottom wall, the at least one light source is arranged on the bottom wall, and the at least one light-reflecting structure is arranged on an inner edge of one of the two sidewalls; and A central axis of each light-reflecting structure coincides with a central axis of a light source corresponding to the light-reflecting structure, or a central axis of each light-reflecting structure is parallel to a central axis of a light source corresponding to the light-reflecting structure.

Preferably, in a case where a central axis of each light-reflecting structure is parallel to a central axis of a light source corresponding to the light-reflecting structure, a plane determined by the central axis of the light-reflecting structure and the central axis of a light source corresponding to the light-reflecting structure is perpendicular to a sidewall on which the light-reflecting structure is arranged.

Preferably, both of the two sidewalls are flat sidewalls; or

A sidewall of the two sidewalls on which no light-reflecting structure is arranged is a flat sidewall, and an edge of a sidewall on which a light-reflecting structure is arranged bends towards the flat sidewall.

Preferably, the set of light sources includes at least one light source, the respective light sources are arranged separately, the set of light-reflecting structures includes at least two light-reflecting structures, each of the at least one light source corresponds to two light-reflecting structures, and both of the two light-reflecting structures are used for reflecting rays at the central region of light emitted from their corresponding light source towards two sides of the corresponding light source.

Preferably, the lampshade includes a bottom wall and two sidewalls arranged oppositely, the two sidewalls are respectively positioned at two sides of the bottom wall, the at least one light source is arranged on the bottom wall, the two light-reflecting structures corresponding to each light source are respectively arranged on inner edges of the two sidewalls; and A central axis of one of the two light-reflecting structures coincides with a central axis of the corresponding light source, a central axis of the other light-reflecting structure is parallel to the central axis of the corresponding light source; or central axes of the two light-reflecting structures are respectively parallel to the central axis of the corresponding light source.

Preferably, a central axis of one of the two light-reflecting structures coincides with a central axis of the corresponding light source, a central axis of the other light-reflecting structure is parallel to the central axis of the corresponding light source as well as a plane determined by the central axis of the other light-reflecting structure and the central axis of the corresponding light source is perpendicular to a sidewall on which the other light-reflecting structure is arranged; or central axes of the two light-reflecting structures are respectively parallel to the central axis of the corresponding light source as well as a plane determined by the central axis of one of the two light-reflecting structures and the central axis of the corresponding light source and a plane determined by the central axis of the other light-reflecting structure and the central axis of the corresponding light source are respectively perpendicular to two sidewalls on which the two light-reflecting structures are arranged.

Preferably, both of the two sidewalls are flat sidewalls; or

An edge of each of the two sidewalls bends towards the other sidewall.

Preferably, when being viewed in a direction perpendicular to the bottom wall, a shape of each of the light-reflecting structures itself is mirror-symmetrical with respect to a central axis of the shape.

Preferably, each light-reflecting structure of the light-reflecting structures is a prism, one bottom of the prism is close to a light source corresponding to the light-reflecting structure, and the other bottom of the prism is far away from the light source corresponding to the light-reflecting structure; or Each light-reflecting structure of the light-reflecting structures is a semi-cylinder, one bottom of the semi-cylinder is close to a light source corresponding to the light-reflecting structure, and the other bottom of the semi-cylinder is far away from the light source corresponding to the light-reflecting structure; or Each light-reflecting structure of the light-reflecting structures is a pyramid, a vertex of the pyramid is close to a light source corresponding to the light-reflecting structure, and a bottom of the pyramid is far away from the light source corresponding to the light-reflecting structure; or Each light-reflecting structure of the light-reflecting structures is a semi-cone, a vertex of the semi-cone is close to a light source corresponding to the light-reflecting structure, and a bottom of the semi-cone is far away from the light source corresponding to the light-reflecting structure.

Preferably, a sidewall of the lampshade on which a light-reflecting structure is arranged and the light-reflecting structure are integrally formed, or are separately formed and then the light-reflecting structure is attached to the sidewall.

Preferably, the lampshade is formed of reflective material; and/or

The light source is a light emitting diode or an electroluminescent sheet.

The present invention also provides a backlight unit including the light-emitting device as described above.

The present invention also provides a display device including the backlight unit as described above.

Advantageous Effects

The light-reflecting structure in the light-emitting device according to the present invention can reflect rays at the central region of light emitted from a light source corresponding to the light-reflecting structure respectively towards two sides of the corresponding light source, so as to decrease light intensity at the central region of light emitted from the light source, and accordingly increase light intensity at the intersection region of light emitted from two adjacent light sources. Thus, a Hotspot phenomenon (i.e., a phenomenon of non-uniform brightness) is improved.

Figure 2:
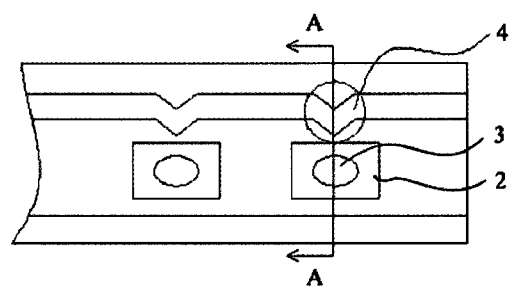
FIG. 2 is a front view of a light-emitting device according to the embodiment 2 of the present invention.
Figure 3:
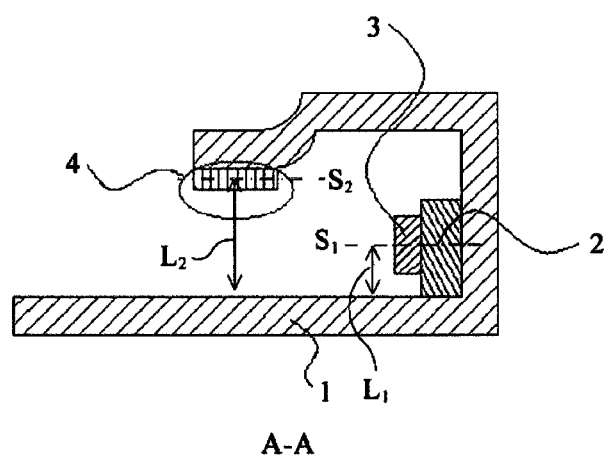
FIG. 3 is a sectional view of FIG. 2 taken along a line A-A in FIG. 2.
Figure 4:
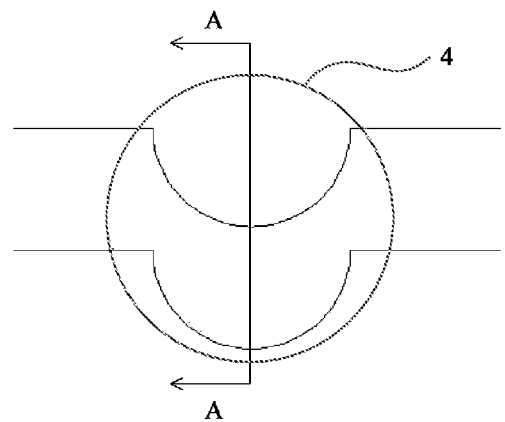
FIG. 4 is a diagram illustrating a part of a lampshade in a light-emitting device according to the embodiment 3 of the present invention.
Figure 5:
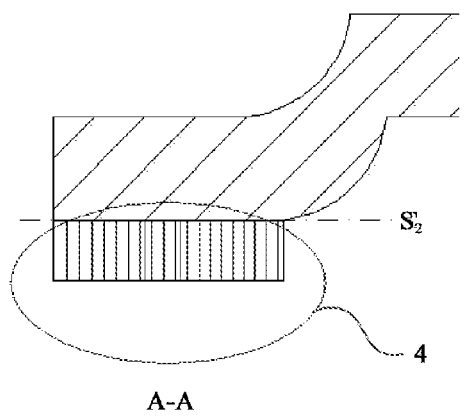
FIG. 5 is a sectional view of FIG. 4 taken along a line A-A in FIG. 4.
Figure 6:
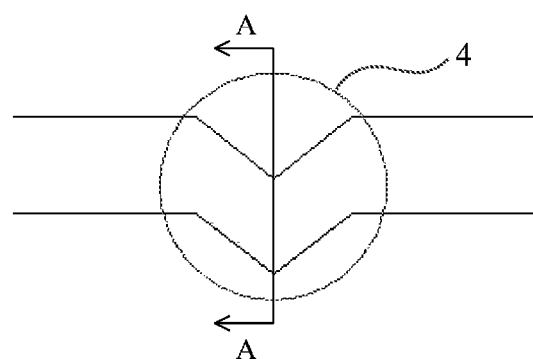
FIG. 6 is a diagram illustrating a part of a lampshade in a light-emitting device according to the embodiment 4 of the present invention.
Figure 7:
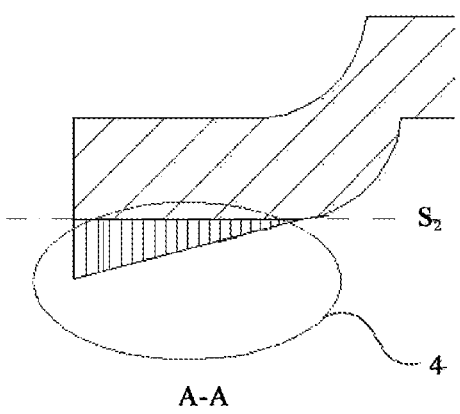
FIG. 7 is a sectional view of FIG. 6 taken along a line A-A in FIG. 6.

In the drawings, 1 and 11—lampshade; 2 and 22—PCB; 3 and 33—light source; 4a to 4d—light-reflecting structure, for example, 4a—a triangular prism (as illustrated in FIGS. 2-3), 4b—a semi-cylinder (as illustrated in FIGS. 4-5), 4c—a triangular pyramid (as illustrated in FIGS. 6-7), and 4d—a semi-cone (as illustrated in FIGS. 4 and 7); α—angle between a central axis of a light source and the outmost ray of light emitted from the light source; $S_1$—central axis of a light source; $S_2$—central axis of a light-reflecting structure; $L_1$—distance between a central axis $S_1$ of a light source and a sidewall of a light-emitting device; $L_2$—distance between a central axis $S_2$ of a light-reflecting structure and the sidewall of the light-emitting device.

DETAILED DESCRIPTION OF THE EMBODIMENTS

For better understanding the solutions of the present invention by a person skilled in the art, a light-emitting device, a backlight unit including the light-emitting device, and a display device including the backlight unit according to the present invention will be described in detail with reference to the drawings and the following embodiments.

Embodiment 1

The present embodiment provides a light-emitting device including a lampshade and a set of light sources. The set of light sources is arranged within the lampshade. The lampshade includes a set of light-reflecting structures. Each light-reflecting structure in the set of light-reflecting structures is used for reflecting rays at the central region of light emitted from a light source respectively towards two sides of the corresponding light source. That is, propagation directions of the rays at the central region are scattered, such that light intensity at the central region is decreased, and light intensity at the intersection region of light emitted from two adjacent light sources is increased. Thus, a Hotspot phenomenon (i.e., a phenomenon of non-uniform brightness) can be improved to a certain extent.

Preferably, the lampshade is formed of reflective material. And more preferably, the lampshade is formed of aluminum.

Preferably, a Light Emitting Diode (LED) or an electroluminescent sheet is used as the light source.

Figure 1:
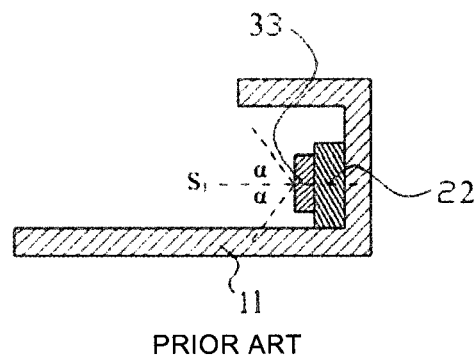
FIG. 1 is a diagram illustrating the configuration of a light-emitting device in a side-edge backlight unit in the prior art.

It should be noted that, light intensity of rays at the central region of light emitted from a light source is generally higher, but light intensity of rays at the periphery of light emitted from the light source is generally lower. Thus, "rays at the central region" mentioned in the present invention are rays of which light intensity is higher than that of rays in the periphery. As shown in FIG. 1, taking a LED of which a light-emitting angle is 120 degrees (i.e., 2α=120°) as an example, wherein light intensity of rays of which light-emitting angles are about 40°~60° (i.e., 2α=40°~60°), such rays refer to as "rays at the central region".

The present embodiment further provides a backlight unit including the light-emitting device as described above.

The present embodiment further provides a display device including the backlight unit as described above.

Embodiment 2

As shown in FIGS. 2 and 3, the present embodiment provides a light-emitting device including a lampshade 1, a PCB (Printed Circuit Board) 2, and a set of light sources 3.

The set of light sources 3 includes at least one light source, and respective light sources are arranged in a row and positioned on the PCB 2 separately. The PCB 2 is arranged on the bottom wall of the lampshade 1.

The lampshade 1 includes a set of light-reflecting structures 4a, and the set of light-reflecting structures 4a includes at least one light-reflecting structure. As shown in FIG. 3, in the present embodiment, each light source 3 corresponds to one light-reflecting structure 4a, and each light-reflecting structure 4a is used for reflecting rays at the central region of light emitted from its corresponding light source 3 towards two sides of the corresponding light source 3 (wherein the "two sides" refer to two sides in the direction of the row in which respective light sources are arranged), such that light intensity of rays at the central region of light emitted from each light source is decreased, and light intensity at the intersection region of light emitted from two adjacent light sources is increased accordingly. Thus, a Hotspot phenomenon can be improved.

The lampshade 1 includes a bottom wall and two sidewalls arranged oppositely. The two sidewalls are positioned at two sides of the bottom wall, respectively. The at least one light source 3 is arranged on the bottom wall. The at least one light-reflecting structure 4 is arranged on an inner edge of one of the two sidewalls. A central axis of each light-reflecting structure 4a is parallel to a central axis of the corresponding light source 3 of the light-reflecting structure 4a, and a plane determined by the central axis of the light-reflecting structure and the central axis of the corresponding light source of the light-reflecting structure is perpendicular to a sidewall on which the light-reflecting structure is arranged. As shown in FIG. 3, a distance between a central axis $S_2$ of a light-reflecting structure 4a and a sidewall opposite to the light-reflecting structure 4a is $L_2$, and a distance between a central axis $S_1$ of a light source 3 corresponding to the light-reflecting structure 4a and the above opposite sidewall is $L_1$. Wherein $S_1$ is parallel to $S_2$ and $L1 \ne L2$. Of course, the central axis of the light-reflecting structure 4a may coincide with the central axis of the corresponding light source 3 of the light-reflecting structure 4a.

Preferably, a sidewall of two sidewalls of the lampshade 1 on which no light-reflecting structure 4a is arranged is a flat sidewall, and an edge of a sidewall on which a light-reflecting structure 4a is arranged bends towards the flat sidewall, so as to converge light. Of course, both of the two sidewalls may be flat sidewalls.

Preferably, when being viewed in a direction perpendicular to the bottom wall, a shape of each light-reflecting structure 4a itself is mirror-symmetrical with respect to a central axis of the shape, such that rays at the central region of light emitted from a light source 3, light intensity of respective rays reflected towards two sides of the light source 3 are the same, thereby making light uniform.

In the present embodiment, the light-reflecting structure 4a is a prism such as a triangular prism (as shown in FIGS. 2 and 3). One bottom of the prism is close to a light source corresponding to the light-reflecting structure 4a, and the other bottom of the prism is far away from the light source corresponding to the light-reflecting structure 4a.

In the present embodiment, in the lampshade 1, a sidewall on which a light-reflecting structure 4a is arranged and the light-reflecting structure 4a are integrally formed. As shown in FIGS. 2 and 3, the light-reflecting structure 4a is formed on the sidewall by way of stamping, or the light-reflecting structure 4a may be formed by way of molding or the like. Wherein a lampshade with a light-reflecting structure formed by way of stamping has advantages of material saving, small size, and the like relative to a lampshade with a light-reflecting structure formed by other way, because there is no additional material is used. Of course, the sidewall and the light-reflecting structure may be separately formed. For example, the light-reflecting structure may be attached to the sidewall.

The present embodiment further provides a backlight unit including a light guide plate and a light-emitting device arranged on the light guide plate, wherein the light-emitting device is the light-emitting device as described above.

The present embodiment further provides a display device including the backlight unit as described above.

Other configurations of the present embodiment and functions thereof are the same as those according to embodiment 1, thus description thereof is omitted.

Embodiment 3

As shown in FIGS. 4 and 5, the present embodiment differs from embodiment 2 in that:

In the present embodiment, each light-reflecting structure 4b in a lampshade of the light-emitting device is a semi-cylinder. One bottom of the semi-cylinder is close to a light source corresponding to the light-reflecting structure 4b, the other bottom of the semi-cylinder is far away from the light source corresponding to the light-reflecting structure 4b, and a cylindrical side of the semi-cylinder directs towards the inside of the lampshade.

Other configurations of the present embodiment and functions thereof are the same as those according to embodiment 2, thus description thereof is omitted.

Embodiment 4

As shown in FIGS. 6 and 7, the present embodiment differs from embodiment 2 in that:

In the present embodiment, each light-reflecting structure 4c in a lampshade of the light-emitting device is a pyramid such as a triangular pyramid. A vertex of the pyramid is close to a light source corresponding to the light-reflecting structure 4c, and a bottom of the pyramid is far away from the light source corresponding to the light-reflecting structure 4c.

Other configurations of the present embodiment and functions thereof are the same as those according to embodiment 2, thus description thereof is omitted.

Embodiment 5

As shown in FIGS. 4 and 7, the present embodiment differs from embodiment 2 in that:

In the present embodiment, each light-reflecting structure 4d in a lampshade of the light-emitting device is a semi-cone. A vertex of the semi-cone is close to a light source corresponding to the light-reflecting structure 4d, a bottom of the semi-cone is far away from the light source corresponding to the light-reflecting structure 4d, and a convex surface of the semi-cone directs towards inside of the lampshade.

Other configurations of the present embodiment and functions thereof are the same as those according to embodiment 2, thus description thereof is omitted.

Embodiment 6

The present embodiment differs from embodiment 2 in that:

In the present embodiment, the set of light-reflecting structures includes at least two light-reflecting structures. Each light source corresponds to two light-reflecting structures, and both the two light-reflecting structures are used for reflecting rays at the central region of light emitted from the corresponding light source towards two sides of the corresponding light source.

The two light-reflecting structures are arranged on inner edges of two sidewalls of a lampshade, respectively.

A central axis of one of the two light-reflecting structures coincides with a central axis of a light source corresponding to the one light-reflecting structure, a central axis of the other of the two light-reflecting structures is parallel to the central axis of the light source corresponding to the other light-reflecting structure as well as a plane determined by the central axis of the other light-reflecting structure and the central axis of the light source corresponding to the other light-reflecting structure is perpendicular to a sidewall on which the other light-reflecting structure is arranged; or Central axes of the two light-reflecting structures are parallel to a central axis of a light source corresponding to the two light-reflecting structures, respectively, as well as a plane determined by the central axis of one of the two light-reflecting structures and the central axis of the light source corresponding to the two light-reflecting structures and a plane determined by the central axis of the other light-reflecting structure and the central axis of the light source corresponding to the two light-reflecting structures are respectively perpendicular to sidewalls on which the two light-reflecting structures are arranged.

Both of the two sidewalls are flat sidewalls; or an edge of each of the two sidewalls bends towards the other of the two sidewalls, so as to converge light.

Other configurations of the present embodiment and functions thereof are the same as those according to embodiment 2, thus description thereof is omitted.

It should be understood that, the above embodiments are only exemplary embodiments for the purpose of explaining the principle of the present invention, and the present invention is not limited thereto. For a person having ordinary skill in the art, various improvements and modifications may be applied to the present invention without departing from the spirit and essence of the present invention. These improvements and modifications are also covered by the scope of the claims of the present invention.

What is claimed is:

1. A light-emitting device comprising:
   a lampshade including a bottom wall and two sidewalls arranged at two opposite sides of the bottom wall;
   a plurality of light sources arranged within the lampshade, at least two of the plurality of light sources being arranged separately from one another; and
   a plurality of light-reflecting structures arranged in the lampshade such that at least one of the plurality of light-reflecting structures corresponds to at least one of the plurality of light sources, and configured to reflect light rays at the central region of light emitted from a corresponding light source towards two sides of the corresponding light source,
   wherein the plurality of light sources are arranged on the bottom wall, and the plurality of light-reflecting structures are arranged on an inner edge of one of the two sidewalls, such that
   a central axis of each light-reflecting structure coincides with a central axis of a light source corresponding to the light-reflecting structure, or a central axis of each light-reflecting structure is parallel to a central axis of a light source corresponding to the light-reflecting structure.

2. The light-emitting device according to claim 1, wherein in a case where the central axis of each light-reflecting structure is parallel to the central axis of the light source corresponding to the light-reflecting structure, a plane determined by the central axis of the light-reflecting structure and the central axis of the light source corresponding to the light-reflecting structure is perpendicular to a sidewall on which the light-reflecting structure is arranged.

3. The light-emitting device according to claim 1, wherein both of the two sidewalls are flat sidewalls; or
   a sidewall of the two sidewalls on which no light-reflecting structure is arranged is a flat sidewall, and an edge of a sidewall on which a light-reflecting structure is arranged bends towards the flat sidewall.

4. The light-emitting device according to claim 1, wherein a sidewall of the lampshade on which a light-reflecting structure is arranged and the light-reflecting structure are integrally formed, or are separately formed and then the light-reflecting structure is attached to the sidewall.

5. The light-emitting device according to claim 1, wherein the lampshade is formed of reflective material; or
   the light source is a light emitting diode or an electroluminescent sheet.

6. The light-emitting device according to claim 1, wherein when being viewed in a direction perpendicular to the bottom wall, a shape of each of the light-reflecting structures itself is mirror-symmetrical with respect to a central axis of the shape.

7. The light-emitting device according to claim 6, wherein each light-reflecting structure of the light-reflecting structures is a prism, one bottom of the prism is close to a light source corresponding to the light-reflecting structure, and the other bottom of the prism is far away from the light source corresponding to the light-reflecting structure; or
   each light-reflecting structure of the light-reflecting structures is a semi-cylinder, one bottom of the semi-cylinder is close to a light source corresponding to the light-reflecting structure, and the other bottom of the semi-cylinder is far away from the light source corresponding to the light-reflecting structure; or
   each light-reflecting structure of the light-reflecting structures is a pyramid, a vertex of the pyramid is close to a light source corresponding to the light-reflecting structure, and a bottom of the pyramid is far away from the light source corresponding to the light-reflecting structure; or
   each light-reflecting structure of the light-reflecting structures is a semi-cone, a vertex of the semi-cone is close to a light source corresponding to the light-reflecting structure, and a bottom of the semi-cone is far away from the light source corresponding to the light-reflecting structure.

8. A backlight unit comprising the light-emitting device according to claim 1.

9. A display device comprising the backlight unit according to claim 8.

10. A light-emitting device comprising:
    a lampshade including a bottom wall and two sidewalls arranged at two opposite sides of the bottom wall;
    a plurality of light sources arranged within the lampshade, at least two of the plurality of light sources being arranged separately from one another; and a plurality of light-reflecting structures arranged in the lampshade such that at least two of the plurality of light-reflecting structures correspond to at least one of the plurality of light sources, and configured to reflect light rays at the central region of light emitted from a corresponding light source towards two sides of the corresponding light source, wherein the plurality of light sources are arranged on the bottom wall, at least two light-reflecting structures corresponding to the at least one light source are respectively arranged on inner edges of the two sidewalls, such that a central axis of one of the two light-reflecting structures coincides with a central axis of the corresponding light source, a central axis of the other light-reflecting structure is parallel to the central axis of the corresponding light source; or central axes of the two light-reflecting structures are respectively parallel to the central axis of the corresponding light source.

11. The light-emitting device according to claim 10, wherein the central axis of one of the two light-reflecting structures coincides with the central axis of the corresponding light source, the central axis of the other light-reflecting structure is parallel to the central axis of the corresponding light source as well as a plane determined by the central axis of the other light-reflecting structure and the central axis of the corresponding light source is perpendicular to the sidewall on which the other light-reflecting structure is arranged; or the central axes of the two light-reflecting structures are respectively parallel to the central axis of the corresponding light source as well as a plane determined by the central axis of one of the two light-reflecting structures and the central axis of the corresponding light source and a plane determined by the central axis of the other light-reflecting structure and the central axis of the corresponding light source are respectively perpendicular to two sidewalls on which the two light-reflecting structures are arranged.

12. The light-emitting device according to claim 10, wherein
both of the two sidewalls are flat sidewalls; or
an edge of each of the two sidewalls bends towards the other sidewall.

13. The light-emitting device according to claim 10, wherein a sidewall of the lampshade on which a light-reflecting structure is arranged and the light-reflecting structure are integrally formed, or are separately formed and then the light-reflecting structure is attached to the sidewall.

14. The light-emitting device according to claim 10, wherein
the lampshade is formed of reflective material; or
the light source is a light emitting diode or an electroluminescent sheet.

15. The light-emitting device according to claim 10, wherein when being viewed in a direction perpendicular to the bottom wall, a shape of each of the light-reflecting structures itself is mirror-symmetrical with respect to a central axis of the shape.

16. The light-emitting device according to claim 15, wherein
each light-reflecting structure of the light-reflecting structures is a prism, one bottom of the prism is close to a light source corresponding to the light-reflecting structure, and the other bottom of the prism is far away from the light source corresponding to the light-reflecting structure; or
each light-reflecting structure of the light-reflecting structures is a semi-cylinder, one bottom of the semi-cylinder is close to a light source corresponding to the light-reflecting structure, and the other bottom of the semi-cylinder is far away from the light source corresponding to the light-reflecting structure; or
each light-reflecting structure of the light-reflecting structures is a pyramid, a vertex of the pyramid is close to a light source corresponding to the light-reflecting structure, and a bottom of the pyramid is far away from the light source corresponding to the light-reflecting structure; or
each light-reflecting structure of the light-reflecting structures is a semi-cone, a vertex of the semi-cone is close to a light source corresponding to the light-reflecting structure, and a bottom of the semi-cone is far away from the light source corresponding to the light-reflecting structure.

17. A backlight unit comprising the light-emitting device according to claim 10.

18. A display device comprising the backlight unit according to claim 17.

* * * * *